US012670322B2

(12) United States Patent
Margolin et al.

(10) Patent No.: US 12,670,322 B2
(45) Date of Patent: Jun. 30, 2026

(54) SPECIALIZED TOKEN PREDICTION BY A LARGE LANGUAGE MODEL TO PROMPT EXTERNAL INTERVENTION

(71) Applicant: Intuit, Inc., Mountain View, CA (US)

(72) Inventors: Itay Margolin, Petah Tikva (IL); Liran Dreval, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 67 days.

(21) Appl. No.: 18/420,565

(22) Filed: Jan. 23, 2024

(65) Prior Publication Data

US 2025/0238615 A1     Jul. 24, 2025

(51) Int. Cl.
| | |
|---|---|
| *G06F 40/279* | (2020.01) |
| *G06F 40/284* | (2020.01) |
| *G06F 40/35* | (2020.01) |
| *G06N 3/08* | (2023.01) |

(52) U.S. Cl.
CPC ................................ *G06F 40/284* (2020.01)

(58) Field of Classification Search
CPC ........ G06F 40/279; G06F 40/30; G06F 40/35; G06N 3/08
USPC ............................ 704/1, 9, 232, 243; 706/12
See application file for complete search history.

(56) References Cited

U.S. PATENT DOCUMENTS

| | | | | | |
|---|---|---|---|---|---|
| 6,941,266 | B1 * | 9/2005 | Gorin | ...................... | G10L 15/22 |
| | | | | | 704/257 |
| 11,049,409 | B1 * | 6/2021 | Zhang | ................... | G06F 40/253 |

| | | | | | |
|---|---|---|---|---|---|
| 11,568,135 | B1 * | 1/2023 | Mansour | ............... | G06F 40/253 |
| 12,231,380 | B1 * | 2/2025 | Rodgers | ................. | G06F 40/30 |
| 2014/0067375 | A1 * | 3/2014 | Wooters | ................. | G06F 40/35 |
| | | | | | 704/9 |
| 2018/0165691 | A1 * | 6/2018 | Heater | ...................... | G06F 40/30 |
| 2019/0384794 | A1 * | 12/2019 | Holly, Jr. | .............. | G06F 40/186 |
| 2021/0160375 | A1 * | 5/2021 | Takeuchi | ................ | G06F 40/30 |
| 2023/0098137 | A1 * | 3/2023 | Ehlen | ..................... | G06F 40/284 |
| | | | | | 704/201 |
| 2024/0086725 | A1 * | 3/2024 | Vilkas | ..................... | G06N 20/00 |
| 2024/0283868 | A1 * | 8/2024 | Ferris | ...................... | G06F 40/35 |
| 2024/0330595 | A1 * | 10/2024 | El Hattami | ............. | G06F 40/35 |

(Continued)

OTHER PUBLICATIONS

Devlin et al. "Bert: Pre-training of Deep Bidirectional Transformers for Language Understanding" arXiv:1810.04805 [cs.CL], May 24, 2019, 16 pages.

*Primary Examiner* — Martin Lerner
(74) *Attorney, Agent, or Firm* — Dinsmore & Shohl LLP

(57)     ABSTRACT

Certain aspects provide methods for training and using large language models (LLMs) to predict specialized tokens for prompting human intervention. A method includes obtaining a plurality of training data instances, each including: a training input including a first timestamp and a prompt and/or an intermediate response to the prompt, and a training output including a second timestamp and a response. The method includes annotating the training output of one or more training data instances to include an action token indicating that external intervention is required, wherein the annotation, for each training data instance, is based on: a time difference between the second timestamp and the first timestamp, a number of words included in the response; or at least one trigger word included in the response. The method also includes training the LLM on the training data instances to predict when external intervention is required and accordingly generate the action token.

10 Claims, 10 Drawing Sheets

(56) References Cited

U.S. PATENT DOCUMENTS

| | | | |
|---|---|---|---|
| 2024/0338532 A1* | 10/2024 | Pauli | G06F 40/30 |
| 2024/0412029 A1* | 12/2024 | Yang | G06F 40/30 |
| 2025/0021768 A1* | 1/2025 | Madan | G06F 40/20 |
| 2025/0039334 A1* | 1/2025 | Balashov | G06F 40/35 |
| 2025/0139162 A1* | 5/2025 | Fieldman | G06F 40/279 |
| 2025/0156642 A1* | 5/2025 | Serry | G06F 40/284 |
| 2025/0157103 A1* | 5/2025 | Inkpen | G06F 40/166 |
| 2025/0165990 A1* | 5/2025 | Butincu | G06F 40/35 |
| 2025/0209309 A1* | 6/2025 | Matamoros | G06N 3/045 |
| 2025/0272557 A1* | 8/2025 | Katz | G06N 3/08 |

\* cited by examiner

100

Datastore 102

Training Data
Instance 104

106

Training a Large
Language Model (LLM)
to Generate Specialized
Tokens

Token Annotation 110

Training 112

114

Predicting Specialized
Tokens to Prompt
Human Intervention

Token(s) Prediction 116

Pause Response Generation Determination 118

Request an External Intervention 120

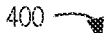

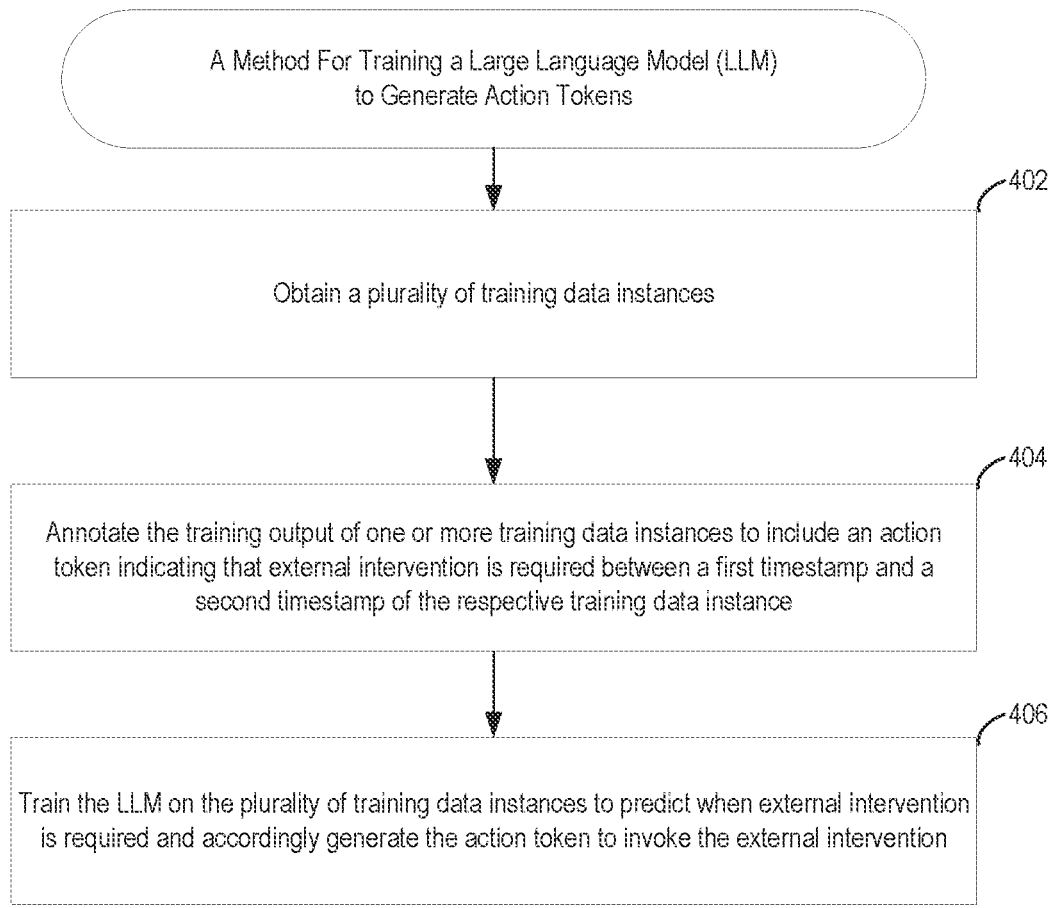

400

A Method For Training a Large Language Model (LLM) to Generate Action Tokens

402

Obtain a plurality of training data instances

404

Annotate the training output of one or more training data instances to include an action token indicating that external intervention is required between a first timestamp and a second timestamp of the respective training data instance

406

Train the LLM on the plurality of training data instances to predict when external intervention is required and accordingly generate the action token to invoke the external intervention

FIG. 4

SPECIALIZED TOKEN PREDICTION BY A LARGE LANGUAGE MODEL TO PROMPT EXTERNAL INTERVENTION

BACKGROUND

Field

Aspects of the present disclosure relate to large language models (LLMs), and in particular to training and using LLMs to predict specialized tokens for prompting external (e.g., human) intervention.

Description of Related Art

A key long-term goal of artificial intelligence (AI) is to create machines capable of understanding and engaging in conversation using natural language. Dialogue systems, which can communicate with users in natural language, can assist users in completing a myriad of tasks, such as making reservations (e.g., task-oriented systems) and/or carrying out unstructured conversations on any topic (e.g., open-domain systems). To excel in these skills, it may be essential that such dialogue systems exhibit competence in understanding natural language, making informed decisions, and generating fluent, engaging, contextually appropriate, and accurate responses.

One example dialogue system is a large language model (LLM)-based dialogue system.

LLMs have demonstrated notable performance for a variety of natural language processing (NLP) tasks. In particular, an LLM is a type of machine learning (ML) model that supports natural language-related tasks, such as generating text, analyzing sentiments, answering prompts (e.g., specific instructions and/or requests posed in natural language) in a conversational manner, translating text from one language to another, and/or the like. LLMs makes it possible for software to "understand" typical human speech or written content as input into an LLM-based dialogue system and respond to it by, in some cases, generating human-understandable responses through natural language generation (NLG).

A popular LLM, which has gained much recent attention, is "ChatGPT," produced by OpenAI®. Generative pre-trained transformer (GPT) models, such as ChatGPT, are a specific type of LLM based on a transformer architecture (e.g., architecture that uses an encoder-decoder structure and does not rely on recurrence and/or convolutions to generate an output), pre-trained in a generative and unsupervised manner (e.g., it learns from data without being given explicit instructions on what to learn). GPT models analyze prompts and predict the best possible response based on their understanding of the language. In particular, the GPT models rely on the knowledge they gain after they their billions or even trillions of parameters are trained on massive datasets.

While LLMs, such as ChatGPT, represent a transformative force in many industries by enabling developers to build conversation-driven applications, these models are not without limitation. For example, while a powerful tool, an LLM is only as good as the underlying training data used to train the model.

In particular, pre-training an LLM starts with an untrained model (i.e., a model that has randomly initialized weights), which is then trained to predict a next token given a sequence of previous tokens (e.g., to thereby generate one or more responses to various prompts). In the context of LLMs, tokens may be units of text that the models process and generate. Tokens can represent individual characters, words, subwords, phrases, or even larger linguistic units, depending on the specific tokenization (e.g., segmentation of text into meaningful units to capture its semantic and syntactic structure) approach used. Tokens act as a bridge between the raw text data and the numerical representations that LLMs are able to work with. Eventually, training on large amounts of text, the model learns to encode the structure of language in general (e.g., it learns, that "I like," for example may be followed by a noun or a participle) as well as the knowledge included in the raw texts that the model was exposed to during training. For example, an LLM may learn, that the sentence "George Washington was . . . " is often followed by "the first president of the United States," and hence has a representation of that piece of knowledge. As such, an LLM may be trained to generate contextually appropriate, text-based responses to a variety of prompts.

An LLM's limited capability of generating text-based responses, however, presents a technical problem for, at least, task-oriented prompts provided to the LLM. In particular, each prompt provided to an LLM may be an information-seeking prompt, a task-oriented prompt, or both. An information seeking-prompt may request some amount and/or type of information associated with the prompt. On the other hand, a task-oriented prompt may request the completion of one or more tasks (e.g., excluding information retrieval). For example, task-oriented prompts may request the performance of one or more tasks, such as sending an email (e.g., "Send an event email to JaneDoe@company.com"), publishing a document, drafting an invoice and sending the invoice to a client, and/or the like.

A text-based response generated for an information-seeking prompt, including the requested information, may be a sufficient response to the information-seeking prompt. A text-based response generated for a task-oriented prompt and/or both an information-seeking and task-oriented prompt, however, may only be a partial response to the prompt. In particular, to adequately resolve a task-oriented prompt and/or both an information-seeking and task-oriented prompt, (1) one or more tasks may need to be carried out and (2) a text-based response may need to be generated based on the results of carrying out the one or more tasks. Accordingly, generating a text-based response to the prompt, without more, may fail to adequately resolve the prompt (e.g., a desired goal state of the prompt, based on the completion of one or more tasks, may not be achieved).

SUMMARY

Certain aspects provide a method for training a large language model (LLM) to predict action tokens, comprising: obtaining a plurality of training data instances, wherein each of the plurality of training data instances comprises: a training input comprising a first timestamp and at least one of a prompt or an intermediate response to the prompt; and a training output comprising a second timestamp and a response to the prompt or the intermediate response; annotating the training output of one or more training data instances to include an action token indicating that external intervention is required between the first timestamp and the second timestamp of the respective training data instance, wherein the annotation is based on at least one of: a time difference between the second timestamp and the first timestamp of each respective training data instance; a number of words included in the response associated with the training output of the respective training data instance; or at least one trigger word included in the response associated with the training output of the respective training data instance; and training the LLM on the plurality of training data instances to predict when external intervention is required and accordingly generate the action token to invoke the external intervention.

Certain aspects provide a method for training a LLM to predict speaker and time tokens, comprising: obtaining a plurality of training data instances, wherein each of the plurality of training data instances comprises: a training input comprising a first timestamp and a prompt or an intermediate response to the prompt; and a training output comprising a second timestamp and a response to the prompt or after the intermediate response; for each of the plurality of training data instances: calculating a time difference between the second timestamp included in the training output and the first timestamp included in the training input; and annotating the training output of the respective training data instance to include a speaker token identifying the LLM and a time token indicating the time difference; and training the LLM on the plurality of training data instances to predict the speaker token and the time token when generating responses for at least one of prompts received by the LLM or after intermediate responses generated by the LLM.

Certain aspects provide a method of predicting specialized tokens to invoke external intervention, comprising: predicting a first speaker token in response to a first prompt or a first response previously generated by a large language model (LLM), the first speaker token identifying a speaker predicted to respond to the first prompt or respond after the first response previously generated by the LLM; predicting a first time token in response to the first prompt or the first response previously generated by the LLM, the first time token indicating an amount of time predicted for generating a first natural language response or receiving a first user-submitted response to the first prompt or after the first response previously generated by the LLM; determining the speaker identified by the first speaker token comprises the LLM; determining the amount of time indicated in the first time token is greater than a threshold; and based on the determinations: pausing response generation by the LLM; and requesting external intervention to perform one or more actions.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts an example method for training an LLM to predict specialized tokens, such as action tokens.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
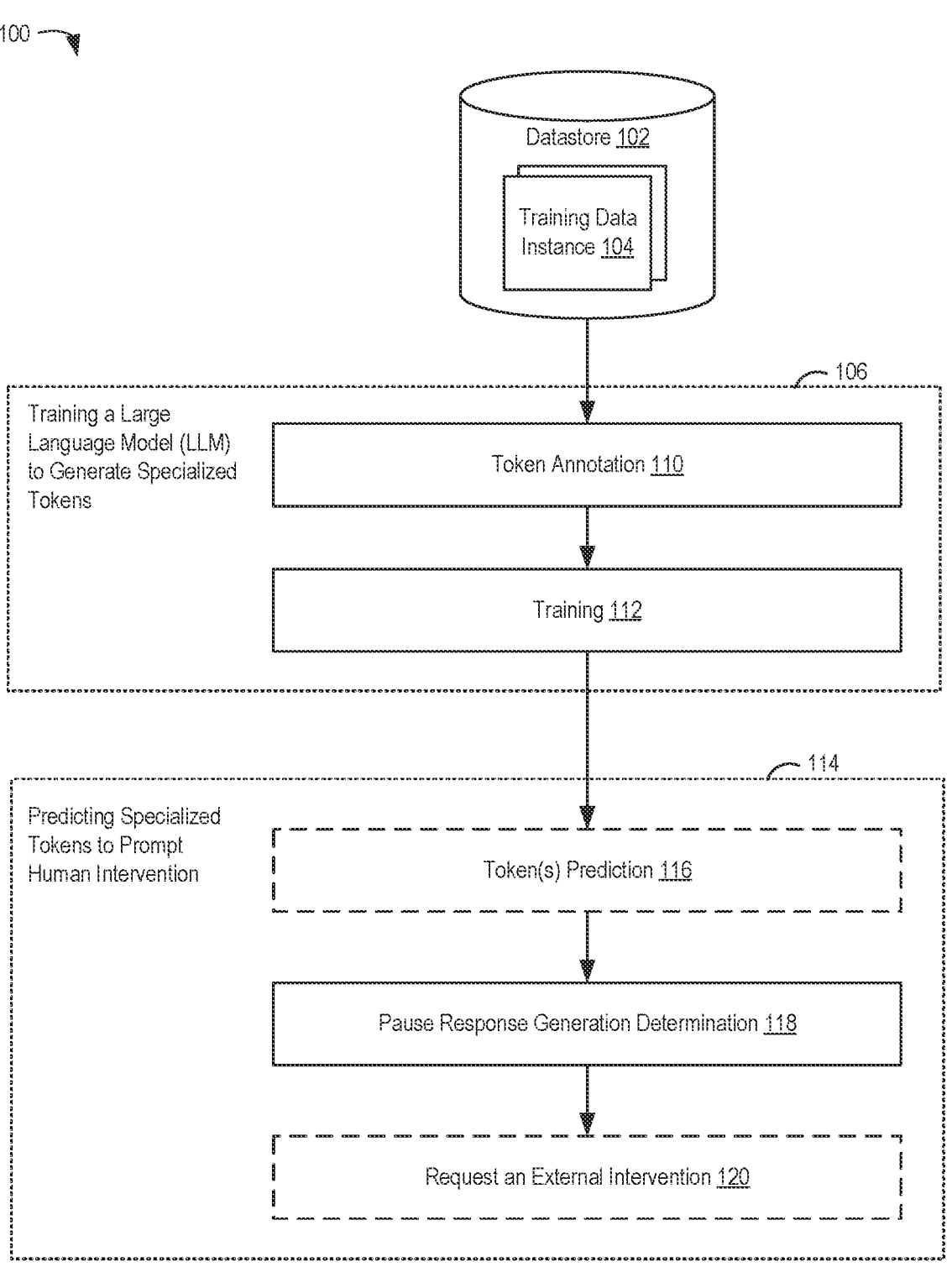
FIG. 1 depicts an example system configured for specialized token prediction.

An LLM's knowledge is limited to the information present in its training dataset, which enables an LLM to predict text-based responses to prompts. A technical problem with existing LLMs is their lack of natural ability to realize that external interaction, e.g., via one or more application programming interfaces (APIs) and/or from a human, may also be necessary to properly respond to one or more prompts, in some cases (e.g., in cases where task-oriented prompts provided to the LLM). Further, a second technical problem of existing LLMs, involves their inability to internally understand that to have a natural language flow, at least for task-oriented prompts, the LLM may need to wait for one or more actions to take place prior to responding to these prompts. Such shortcomings of existing LLMs may lead to the generation of incorrect and misleading responses by the LLMs.

For example, an LLM may receive from a user, a prompt of "Generate and transmit an invoice to Customer Jane Doe for $100," which is a task-oriented prompt requesting the performance of tasks such as (1) generating an invoice and (2) transmitting the invoice to the identified customer. In response to receiving the task-oriented prompt, the LLM may be trained to predict a response to the prompt as "Done," indicating that the requested tasks have been completed. Generating the "Done" response to the user's prompt, without more, may not adequately resolve the prompt (e.g., a desired goal state indicated in the prompt may not be achieved). In particular, while the "Done" response, generated in response to receiving the prompt of "Generate and transmit an invoice to Customer Jane Doe for $100," is a contextually appropriate response to the received prompt, generating the "Done" response prior to achieving the desired goal state indicated in the prompt (e.g., completion of invoice generation and transmittal tasks) is incorrect and misleading. In particular, a user submitting the prompt requesting the LLM to generate and transmit the invoice may rely on the LLM to carry out such tasks. However, the LLM may not have a natural ability to, nor have been previously trained to, recognize that such tasks need to be completed for this prompt prior to generation of the response. As such, the LLM may proceed with immediately generating the "Done" response after receiving the prompt.

Here, the "Done" response may constitute a meaningless response to the received prompt, given none of the requested tasks were completed prior to generating the response.

Based on receiving the "Done" response, the user may assume that the requested tasks have been completed, when in reality, no action has been taken. Taking the LLM response to be factually correct may be detrimental to the user's financial status (e.g., inability to receive payment for the invoice when the invoice was never sent) and/or may result in other negative implications. In some other cases, reliance on an LLM's response that one or more requested tasks have been completed, when such tasks have not been completed, may result in more serious consequences, such as serious injury, loss of life, loss of assets, destruction of property, legal liability, and/or the like. Further, inaccurate statements that are erroneously presented as reliable information erode the credibility of LLM-generated content.

Accordingly, there is a need for a technical solution for training LLMs to predict when external intervention is required such that appropriate action (e.g., human assistance) can be triggered and generation of misleading and meaningless statements, which are erroneously presented as reliable information, can be avoided.

Embodiments described herein overcome the aforementioned technical problems and improve upon the state of the art by training and using LLMs to predict specialized tokens for prompting external (e.g., human) intervention. As described above, tokens are numeric representations of, for example, text which an LLM processes and provides as output. For example, when processing input text, an LLM "tokenizes" the input text in order to perform mathematical processing on the input. Specialized tokens, as described herein, represent a special class of tokens that are not derived from input text. Instead, specialized tokens are generated for a specific purpose and are independent of the specific input provided to an LLM. As described herein, the specialized tokens may be generated for the specific purposes of helping an LLM determine when external intervention is needed (e.g., to perform one or more tasks), such that the LLM can (1) pause response generation and (2) seek external (e.g. human) assistance with the one or more tasks.

Notably, training an LLM to predict specialized tokens used to prompt external intervention gives LLMs new capabilities not found in existing LLMs. In particular, as described above, a technical problem of existing LLMs is their inability to identify when the performance of one or more tasks, in addition to traditional response generation, is necessary to adequately respond to a prompt. The techniques described herein overcome this technical problem and improve upon the state of the art by enabling an LLM to predict when the performance of one or more external tasks is necessary to satisfactorily respond to an input prompt, such as when external intervention is necessary. As such, responses indicating the completion of such tasks, generated by the LLM may be delayed until these tasks are determined to be completed. This improved functionality of the LLM beneficially improves the accuracy, reliability, and meaningfulness of responses generated by the LLM.

In some embodiments described herein, an LLM is trained and used to predict a specialized token referred to herein as an "action token." An action token may be predicted by the LLM when the LLM anticipates that external (e.g., human) assistance with one or more tasks is needed. The action token may be predicted in response to a received prompt or a previously generated response for a prompt previously-received by the LLM. As an illustrative example, an LLM may anticipate that human assistance is needed based on receiving a prompt requesting to "Generate and transmit an invoice to Customer Jane Doe for $100" (e.g., human assistance with respect to invoice generation and invoice transmittal). Thus, an action token may be predicted in response to receiving the specific prompt, as opposed to predicting a response appropriate for the prompt (e.g., determined based on past training). A predicted action token may trigger an LLM to pause response generation and request an external intervention (e.g., such as paging a human actor for intervention).

Training an LLM to predict action tokens may include both (1) training data pre-processing and (2) supervised learning techniques. Supervised machine learning is a type of machine learning that learns the relationship between input and output. In particular, each training data instance used to train the LLM may include (1) a training input comprising input text (e.g., a prompt or a first response to a prompt) and (2) a training output comprising output text that may be generated by the LLM in response to the input text (e.g., a response to the prompt or a response after the first response). Each training data instance may also include a first timestamp associated with the input text and a second timestamp associated with the output text (e.g., where each timestamp represents a possible time when the input text and the output text may be generated by a user or the LLM). Each of these training data instances may initially lack information about whether or not external assistance with one or more tasks is needed to adequately and sufficiently respond to the input text (e.g., which may be necessary information to enable the LLM to perform one or more tasks and thus, generate meaningful responses). Accordingly, embodiments herein may utilize data pre-processing techniques to annotate the training data instance(s) prior to training the model. For example, one or more training data instances may be annotated to include an action token, thereby specifying for the specific input text, that human intervention is required. In some embodiments, a training data instance is annotated to include the action token based on a speed metric calculated for the training data instance being above a threshold. A speed metric associated with a training data instance may be calculated as a number of tokens included in the output text divided by the difference in time between the first timestamp and the second timestamp (e.g., speed metric=number of tokens/unit of time). In some embodiments, a training data instance is annotated to include the action token based on one or more tokens included in the text output associated with the training data instance including trigger word(s) (e.g., including trigger words and/or phrases). For example, trigger words such as "Done," "Complete," or "Here you go" included in the text output may indicate that some action was/should be taken prior to generation of the text output. Training data instances, including one or more instances annotated with the action token, may be used to train an LLM to predict when the action token should be generated to invoke the human intervention.

In some embodiments, an LLM is trained and used to predict a first specialized token referred to herein as a "speaker token" and a second specialized token referred to herein as a "time token." A speaker token predicted by the LLM may represent a speaker predicted by the LLM that is expected to respond to a received prompt or respond after a previously generated response for a received prompt. A time token predicted by the LLM may represent an amount of time predicted by the LLM to generate a response to a received prompt or generate a response after a previously generated response for a received prompt. A speaker token and a time token may be generated for every prompt received and/or response generated by the LLM. For example, an LLM may receive a prompt requesting to "Generate and transmit an invoice to Customer Jane Doe for $100" and determine that the LLM is the predicted next-in-time speaker of the conversation. The LLM may also predict that a most accurate, next-in-time, response to this specific prompt is "Completed," which may be generated by the LLM after ten minutes. As such, in response to the prompt, the LLM may generate a speaker token as "LLM" and a time token as "[10]" (e.g., without generating the predicted response to the prompt). The LLM may be trained to pause response generation and request an external intervention when the speaker token is predicted to be "LLM" and the time token is predicted to be a value (e.g., an integer) greater than a threshold value. A time token value predicted to be greater than the threshold value may indicate to the LLM that one or more tasks are needing to be performed by an external intervention (e.g., by a human actor) prior to generation of a response by the LLM. As such, a predicted speaker token of "LLM" and a predicted time token having a value greater than threshold value may trigger the LLM to pause response generation and request an external intervention, for example, page a human actor for human intervention.

Similar to training an LLM to predict action tokens, training an LLM to predict speaker and time tokens may also include both (1) training data pre-processing and (2) supervised learning techniques. As described above, each training data instance used to train the LLM may include (1) a training input comprising input text (e.g., a prompt or a first response to a prompt) and (2) a training output comprising output text that may be a response to the input text or after the input text (e.g., a response to the prompt or a response after the first response). Each training data instance may also include a first timestamp associated with the input text and a second timestamp associated with the output text. Training data pre-processing techniques may be used to annotate the training output of each training data instance used to train the LLM to include a speaker token and a time token. Specifically, a speaker token may be generated based on a participant of a conversation (e.g., a user or the LLM) associated with the response included in the training output. A time token may be generated based on the absolute difference between the first timestamp and the second timestamp (e.g., indicating an amount of time that may be taken to generate the text output based on the text input). Training data instances, each annotated with a speaker token and a time token, may be used to train the LLM to predict the speaker token and the time token when generating responses for various prompts. As described above, predicted speaker and time tokens may be useful in determining whether external intervention (e.g., human assistance) is required to completely and meaningfully respond to a prompt.

Example System for Specialized Token Prediction Used to Prompt Human Intervention FIG. 1 depicts an example system 100 for training and using an LLM to predict specialized tokens for prompting external (e.g., human) intervention. The specialized tokens may be action tokens and/or speaker and time tokens, as described above. After training, speaker and time tokens may be predicted by the LLM for every line of conversation (e.g., every response to a previous prompt or after an intermediate response) between a user interacting with the LLM and the LLM. These speaker and time tokens may then be used by the LLM to determine whether to trigger external intervention, and accordingly pause response generation by the LLM. Additionally or alternatively, after training, actions tokens may be predicted for one or more lines of conversation between a user interacting with the LLM and the LLM. Unlike speaker and time tokens, action tokens may not always be predicted by the LLM, but when such tokens are predicted, the LLM may be configured to pause response generation and request an external intervention, for example, page a human for the performance of one or more tasks.

As shown at 106 in FIG. 1, training an LLM to predict specialized tokens used to prompt external intervention includes performing token annotation 110 and training 112. Token annotation 110 includes annotating one or more training data instances 104, for example, stored in datastore 102. Each training data instance 104 may include a training input and a training output. The training input of each training data instance 104 may include a first timestamp and a prompt and/or an intermediate response to the prompt, associated with the first timestamp.

In particular, an example training input may be "User [15:00] 'I need a copy of my paystub'" where [15:00] represent the first timestamp and "I need a copy of my paystub" represents a prompt. Another example training input may be "User [15:00] 'I need a copy of my paystub; LLM [15:01] 'Sure, I'm working on it . . . '" where [15:01] represents the first timestamp and "Sure, I'm working on it . . . " represents an intermediate response to a prompt. Further, the training output of each training data instance 104 may include a second timestamp and a response to a prompt or another response after an intermediate response included in a training input associated with the respective training output. An example training output may be "LLM [15:11] 'Done" where [15:11] represents the second timestamp and "Done" represents a response after an intermediate response, such as the intermediate response of "Sure, I'm working on it . . . " described above for an example training input.

Training data instance(s) 104 may be annotated, during token annotation 110, with action tokens and/or speaker and time tokens. Additional details regarding annotating training data instance(s) 104 with action tokens are provided below with respect to FIG. 2A. Further, additional details regarding annotating training data instances 104 with speaker and time tokens are provided below with respect to FIG. 3A.

Training 112 involves training the LLM on training data instances 104 (e.g., after token annotation 110). In some embodiments where training data instance(s) 104 are annotated with action token(s), training 112 includes training the LLM to predict when human intervention is required (e.g., based on a received prompt and/or previously generated intermediate response to a prompt) and accordingly generate the action token to invoke the human intervention. In some embodiments where training data instances 104 are annotated with speaker and time tokens, training 112 includes training the LLM to predict the speaker token and the time token when generating responses for subsequent prompts received by the LLM and/or intermediate responses to prompts generated by the LLM.

After training is complete at 106, the LLM may be used to predict specialized tokens for prompting human intervention at 114 in FIG. 1. Using an LLM to predict specialized tokens for prompting human intervention includes performing token(s) prediction 116, pause response generation determination 118, and/or request an external intervention 120.

Token(s) prediction 116 may include predicting one or more tokens in response to a prompt or a response previously generated by the LLM for a prompt. In some embodiments where the LLM is trained to predict action tokens, action tokens may be predicted for only those prompts and/or previously generated responses that the LLM determines require human intervention. Action tokens may not be predicted for prompts and/or previously generated responses that the LLM determines do not require human intervention. This process of token prediction 116 is described in more detail below with respect to FIG. 2B. On the other hand, in some embodiments where the LLM is trained to predict speaker and time tokens, speaker and time tokens may be predicted for all prompts and/or previously generated responses (irrespective of whether or not such prompts and/or previously generated responses require human intervention). This process of token prediction 116 is described in more detail below with respect to FIGS. 3B and 3C.

Pause response generation determination 118 may include the LLM determining whether or not to generate a response to a prompt or generate a response after a previously generated response (e.g., an intermediate response) to a prompt. In some embodiments, the LLM makes this determination based on whether an action token is predicted for the prompt or the previously generated response (e.g., predicted at token(s) prediction 116). For example, if an action token is predicted for the prompt or the previously generated response, the LLM may determine to pause response generation prior to generating a response to the prompt or generating another response (e.g., to the prompt) after the previously generated response (e.g., described in more detail below with respect to FIG. 2B). In some embodiments, the LLM makes the determination at pause response generation determination 118 based on (1) a speaker identified by a speaker token generated by the LLM for a prompt or a response previously generated by the LLM and (2) an amount of time indicated in a time token generated by the LLM for the prompt or the previously generated response. For example, if (1) a speaker token generated for a prompt comprises the LLM and (2) a time token generated for the prompt indicates an amount of time greater than a threshold amount of time, then the LLM may determine to pause response generation by the LLM (e.g., described in more detail below with respect to FIGS. 3B and 3C).

Request an external intervention 120 involves requesting assistance from a component and/or human, separate from the LLM, to perform one or more tasks. For example, request an external intervention 120 may include paging a human to perform one or more tasks based on a prompt provided to the LLM, prior to generating a response to the prompt or a previously generated response to the prompt. Such paging may occur via short message service (SMS) (commonly known as "texting"), email, one or more instant messaging applications, telegram, etc. The paging message may indicate to a human that their assistance is requested and/or may include information about the history of the chat, such that the human is able to determine what task(s) are needing to be performed. In certain embodiments, the human that is paged to perform the one or more tasks is a human that most recently worked with the user that is conversing with the LLM. For example, historical records of interactions between users and humans may be maintained. Accordingly, if the LLM identifies that external human intervention is required when conversing with a user, the LLM may determine a human that previously worked with this user based on the historical records and page this same human for help with one or more tasks now being requested by the user. If no historical records of interactions are maintained for the user, then the LLM may page any human for help with the task(s).

Request an external intervention 120 may be performed in cases where the LLM also determines to pause response generation. In other words, the LLM may determine to request an external intervention to perform the one or more tasks based on whether an action token was predicted for the prompt or the previously generated response. Further, the LLM may determine to request an external intervention to perform the one or more tasks based on (1) a speaker predicted by the LLM and included in a speaker token generated for the prompt or the previously generated response and (2) an amount of time predicted by the LLM and included in a time token generated for the prompt or the previously generated response.

As described above, identifying when external intervention is needed, and triggering a an external actor (e.g., an API, a human,) to perform one or more tasks when external intervention is determined to be needed, may be critical for avoiding the generation of inaccurate and misleading responses by the LLM. Further, pausing response generation by the LLM, prior to generating a response to a prompt or a previously generated response for the prompt, may help to ensure that the requested one or more tasks are completed prior to the generation of any response indicating that such tasks have been carried out. As such, training an LLM to identify when external intervention is needed, request external intervention, and pause response generation enhances the overall functioning and capability of the LLM, which in turns improves performance of the LLM, for example, to generate more reliable and accurate responses.

Aspects Related to Training and Using an LLM to Generate Action Tokens

Figure 2A:
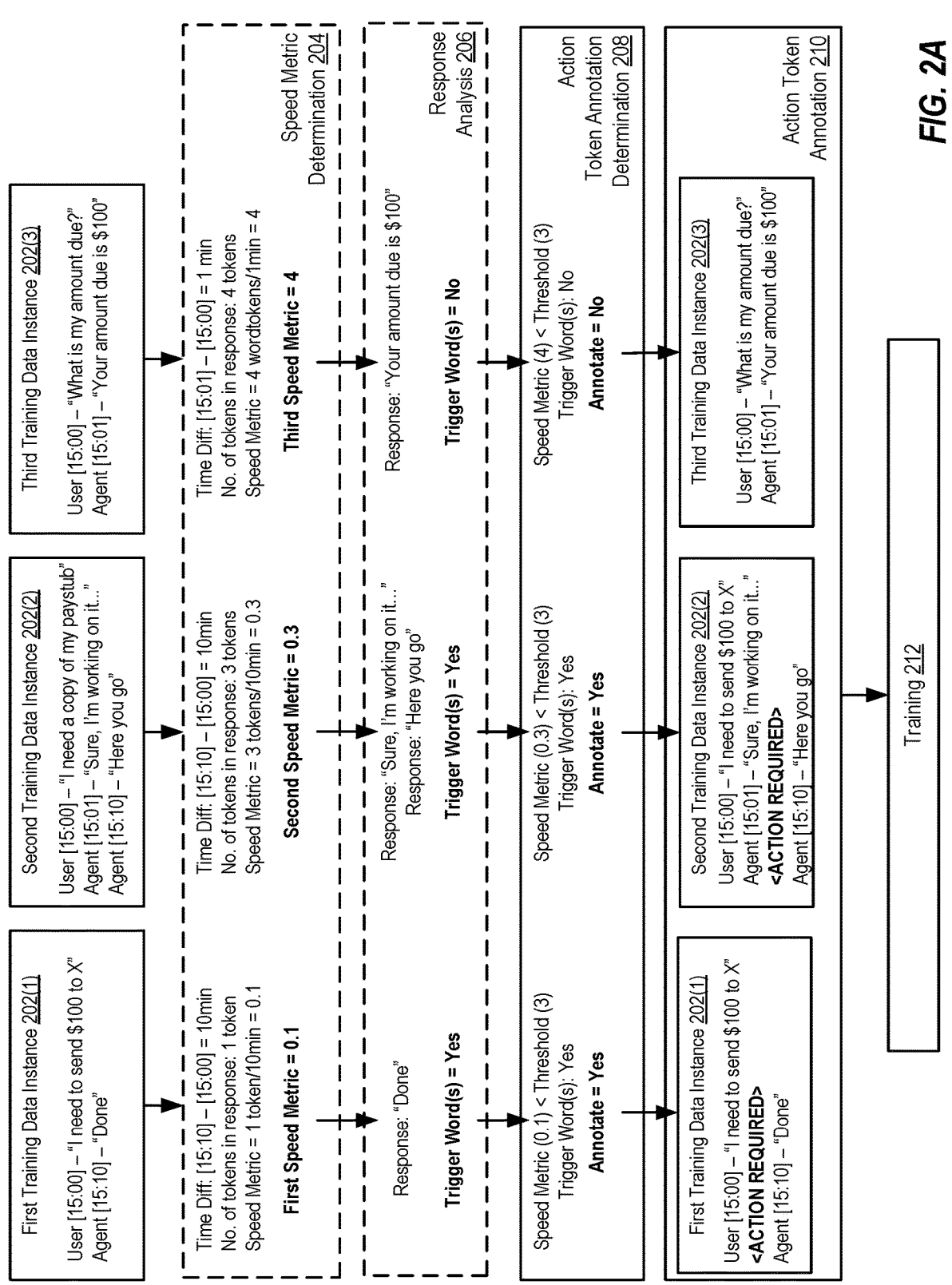
FIG. 2A depicts example training of an LLM to predict action tokens.

FIG. 2A depicts example training of an LLM to predict action tokens. As shown, training an LLM to predict action tokens may include performing a speed metric determination 204, response analysis 206, action token annotation determination 208, action token annotation 210, and/or training 212. Speed metric determination 204, response analysis 206, action token annotation determination 208, and action token annotations 210 may be used to pre-process training data via token annotation, such as token annotation 110 described above with respect to FIG. 1.

For example, a plurality of training data instances may exist prior to training the LLM, such as first training data instance 202(1), second training data instance 202(2), and third training data instance 202(3) shown in FIG. 2A, which collectively may be referred to as "training data instances 202" and are examples of training data instances 104 of FIG. 1. First training data instance 202(1) includes a first training input "User [15:00]-'I need to send $100 to X'" and a first training output "Agent [15:10]-'Done'." The agent may represent a customer agent (e.g., a human) conversing with the user that previously responded to the user's request. Second training data instance 202(2) includes a second training input "User [15:00]-'I need a copy of my paystub'; Agent [15:01]-'Sure, I'm working on it . . . '" and a second training output "Agent [15:10]-'Here you go'." Third training data instance 202(3) includes a third training input "User [15:00]-'What is my amount due?'" and a third training output "Agent [15:01]-'Your amount due is $100'."

Each of the first training data instance 202(1), the second training data instance 202(2), and the third training data instance 202(3) include a first timestamp and a prompt or a response to a prompt (e.g., an intermediate response) in their respective training input, and a second timestamp and a response to the prompt or another response after the response to the prompt (e.g., a response after the intermediate response) in their respective training output. For example, the first training input includes a first timestamp of "[15:00]" and a first prompt of "I need to send $100 to X." The first training output includes a second timestamp of "[15:01]" and a response to the prompt as "Done." The first prompt may be an example prompt provided to an agent by a user, while the response may represent a response previously generated by the agent in response to the prompt received from the user.

Speed metric determination 204 may be performed for each of the first training data instance 202(1), the second training data instance 202(2), and the third training data instance 202(3). Speed metric determination 204 may include determining a number of tokens generated per unit of time (e.g., words per minute) metric for each training data instance. In particular, to calculate a number of tokens (e.g., where each token may be a word or a phrase) generated per unit of time metric for a training data instance, (1) a time difference between the second timestamp and the first timestamp of the training data instance is calculated, (2) a number of tokens included in the response associated with the training output is determined, (3) a ratio of the number of tokens to the time difference is calculated. The ratio of the number of tokens to the time difference represents the speed metric determined for the training data instance. For example, the speed metric for first training data instance 202(1) is equal to 0.1. Specifically, (1) a time difference between the second timestamp [15:10] and the first timestamp [15:00] of first training data instance 202(1) is equal to ten minutes, (2) a number of tokens (e.g., where each word represents a token) included in the response of first training data instance 202(1) is equal to one token, and (3) a ratio of the number of tokens to the time difference is calculated as (1 token/10 minutes), which is equal to 0.1. As shown in FIG. 2A, similar steps are performed to also calculate a speed metric for second training data instance 202(2) and third training data instance 202(3), as well.

Response analysis 206 may be performed to identify if at least one trigger word is included in the response associated with the training output of each respective training instance 202. In this context, "trigger words" may refer to generic response words or phrases included in a token of a training output response of a training data instance that may be provided as a response to many different prompts. In other words, trigger words may be meaningless with respect to understanding (1) what the original prompt was that the generated response is responding to. Example trigger words may include words and phrases such as "Done," "Complete," "Here you go," "You're welcome," and/or the like. For example, "Done" may be a valid response to many different prompts and/or generated after many different intermediate responses, and provides no context about the original prompt and/or intermediate response to the original prompt that is being responded to.

To determine if at least one trigger word is included in the response associated with the training output of a training data instance, each word and/or phrase included in the response may be compared to an enumerated list of trigger words to determine if any matches exist (e.g., a match indicates that the response includes at least one trigger word). Alternatively, a response such as "I have sent the $100 to Customer X on your behalf" may be a valid response to generally only prompts requesting the LLM to send money to a customer, and provides information about what the original prompt was requesting the LLM to perform.

As shown in FIG. 2A, response analysis 206 performed for first training data instance 202(1) identifies at least one trigger word of "Done" included in the response and response analysis 206 performed for second training data instance 202(2) identifies at least one trigger word of "Here you go." Response analysis 206 performed for third training data instance 202(3), however, does not identify any triggers words included in the response "Your amount due is $100."

Although both speed metric determination 204 and response analysis 206 are performed for each training data instance 202 in the example of FIG. 2A, in some other embodiments, only speed metric determination 204 is performed for training data instances 202. Further, in some embodiments, only response analysis 206 is performed for training data instances 202.

Action token annotation determination 208 involves determining whether one or more training data instances 202 should include an action token. This determination may be based on the speed metric calculated for each training data instance 202 (e.g., for speed metric determination 204) and/or trigger word(s) being included in the response for each training data instance 202 (e.g., determined during response analysis 206). For example, a speed metric calculated for a training data instance that is less than a threshold speed metric may indicate that the training data instance should include the action token. As another example, a trigger word determination of "Yes" indicating that at least one trigger word is included in the response may indicate that the training data instance should include the action token. Thus, an action token may be added if at least the speed metric is less than a threshold speed metric or if at least one trigger word is included in the response.

As shown in FIG. 2A, action token annotation determination 208, performed for first training data instance 202(1), determines that the speed metric associated with first training data instance 202(1) is below a threshold equal to three (e.g., 0.1 words per minute<3 words per minute). Further, action token annotation determination 208, performed for first training data instance 202(1) determines that the response includes at least one trigger word. Based on this determination, first training data instance 202(1) is annotated, during action token annotation 210, to include the "<ACTION REQUIRED>" token (e.g., referred to herein as the action token). Similar steps are taken to determine whether the action token should be added to second training data instance 202(2) and third training data instance 202(3). Further, similar steps are taken to add the action token to second training data instance 202(2) and/or third training data instance 202(3) where it is determined that these training data instances should include the action token.

After action token annotation determination 208 and/or action token annotation 210 is performed for all training data instances 202, training 212 (e.g., an example of training 112 of FIG. 1) is performed to train the LLM to predict when human intervention is required and accordingly generate the action token to invoke the human intervention. Further, training 212 may include training the LLM to pause response generation after generating the action token.

Figure 2B:
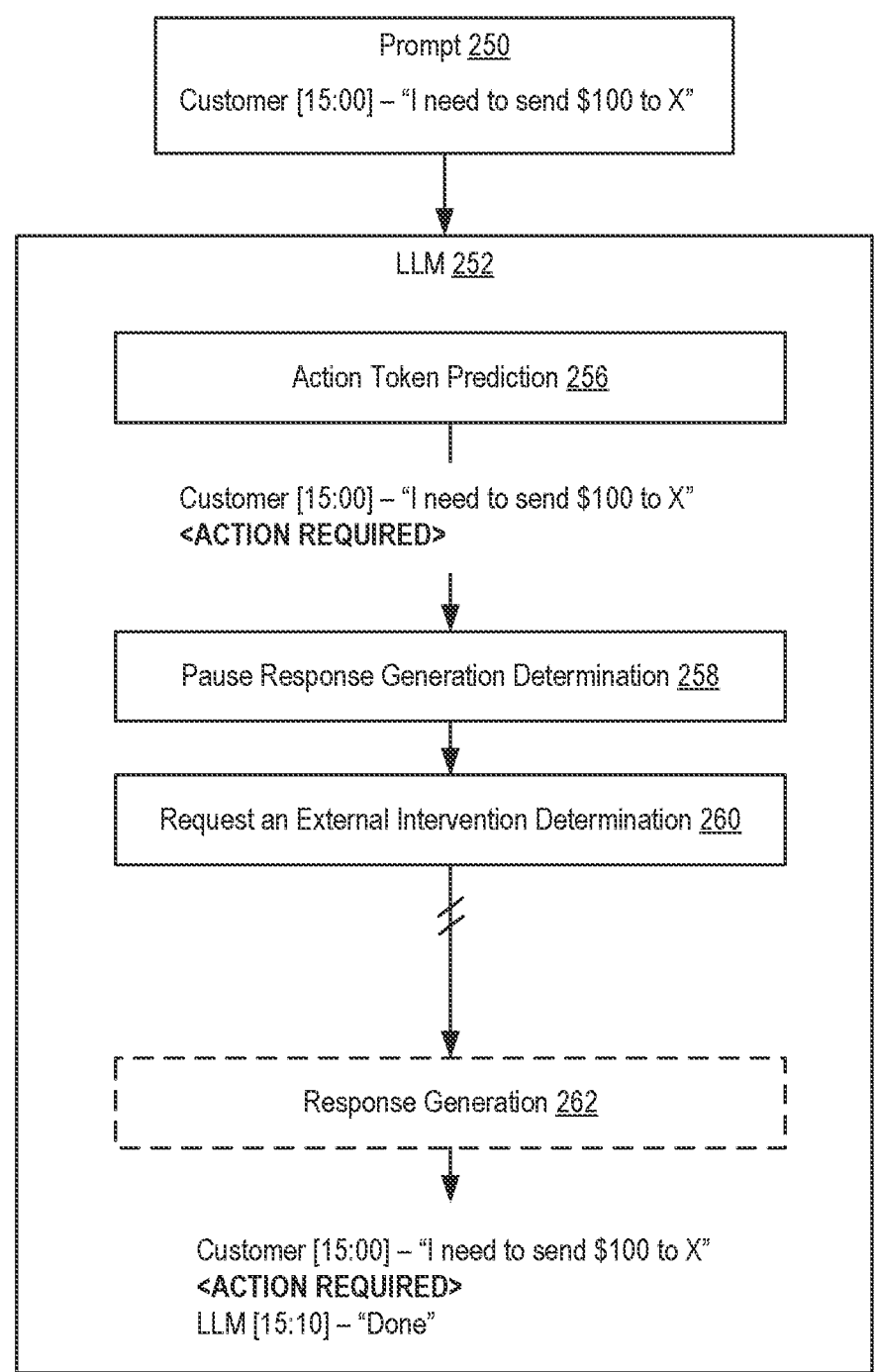
FIG. 2B depicts example action token prediction for human intervention prompting.

FIG. 2B depicts example action token generation for human intervention prompting. A previously trained LLM (e.g., according to the steps described with respect to FIG. 2A) may be used for such action token generation.

For example, as shown in FIG. 2B, an LLM 252 (e.g., trained to predict action tokens) may receive a prompt 250. In this example, prompt 250 is a user request stating "I need to send $100 to X." Prompt 250 is a task oriented-prompt requesting a state change from an initial state to a desired goal state, based on the completion of $100 being successfully sent to X.

LLM 252 predicts whether an action token should be generated for prompt 250 based on receiving prompt 250 (e.g., during action token prediction 256). In other words, LLM 252 predicts whether prompt 250 is likely to require external intervention, and therefore requires an action token to prompt such external intervention. LLM 252 makes this determination based on other prompts received during training, which may be similar to prompt 250 received by LLM 252.

In this example, LLM 252 predicts that an action token is required (e.g., more specifically, that prompt 250 will need human assistance with one or more tasks) and thereby generates the action token. For example, as shown in FIG. 2B, LLM 252 generates "<ACTION REQUIRED> token after receiving prompt 250 from the customer.

In some cases, prior to performing action token prediction 256, LLM 252 may predict an intermediate response to prompt 250. For example, although not shown in this example, an intermediate response to prompt 250 predicted by LLM 252 may be "Sure, I'm working on it . . . "

After generating the action token, LLM 252 proceeds to determine whether it needs to pause response generation (e.g., during pause response generation determination 258). LLM 252 may determine to pause response generation when an action token is generated at action token prediction 256, and may determine not to pause response generation when an action token is not generated at action token prediction 256. Here, because an action token was generated, LLM 252 determines to pause response generation (e.g., to stop predicting a response to prompt 250, at least for a period of time and/or until an indication is received instructing LLM 252 to re-start response generation) during pause response generation determination 258.

In addition to determining whether to pause response generation by LLM 252, LLM 252 also determines whether it needs to request an external intervention for performing one or more tasks responsive to prompt 250 (e.g., during request an external intervention determination 260). Similar to pause response generation determination 258, during request an external intervention determination 260, LLM 252 may determine to request an external intervention when an action token is generated at action token prediction 256, and may determine not to request an external intervention when an action token is not generated at action token prediction 256. Here, because an action token was generated, LLM 252 determines to request external intervention by paging a human for assistance. Although request an external intervention determination 260 is performed after pause response generation determination 258 in FIG. 2B, in some other embodiments, pause response generation determination 258 and request an external intervention determination 260 are performed in a different order or are performed simultaneously.

After an external intervention is requested (e.g., a human is paged for assistance), an external actor (e.g., a human) may take over to perform one or more tasks and/or respond to prompt 250 directly. For example, for prompt 250, assistance by a human may be requested and the human may send $100 to X via mail, email, one or more money transmitting applications, etc., on behalf of the prompting customer and then correspond with the customer indicating that the requested tasks have been completed (e.g., the human may engage in legacy chat with the customer (without the LLM) to let the customer know that the requested tasks have been completed). In some other embodiments, however, the human may only perform the requested tasks. After completion of the requested tasks, the human may instruct (e.g., via some user input, such as a pressing a button) LLM 252 to restart response generation and generate a response for prompt 250. For example, during response generation 262 in FIG. 2B, LLM 252 may generate a response to prompt 250 of "Done."

Figure 3A:
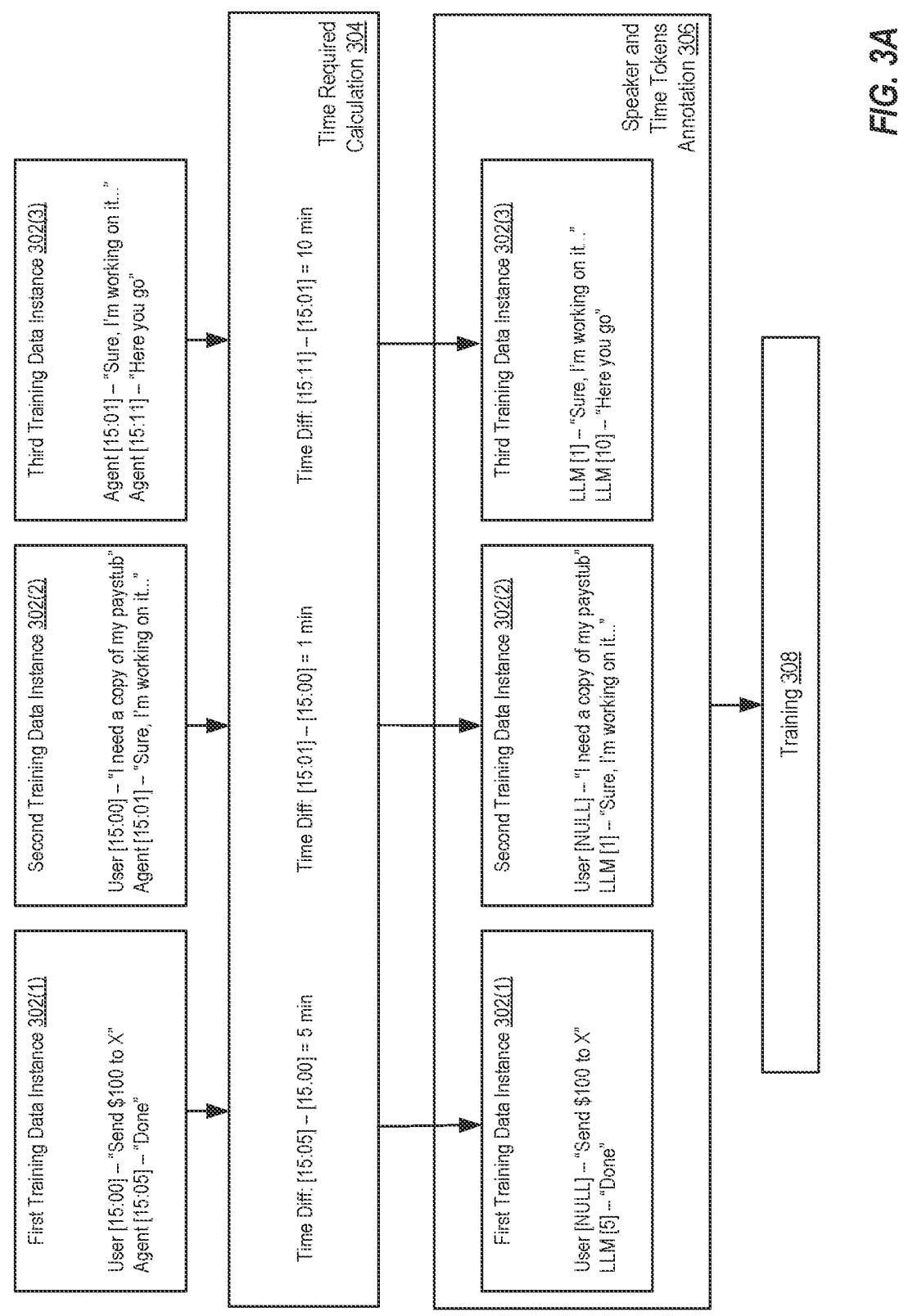
FIG. 3A depicts example training of an LLM to predict speaker and time tokens.

Aspects Related to Training and Using an LLM to Generate Speaker and Time Tokens FIG. 3A depicts an example of training of an LLM to generate speaker and time tokens. As shown, training an LLM to generate speaker and time tokens may include performing a time required calculation 304, speaker and time tokens annotation 306, and training 308. Time required calculation 304 and speaker and time tokens annotation 306 may be used to pre-process training data to make it more effective for training an LLM.

For example, a plurality of training data instances may exist prior to training the LLM, such as first training data instance 302(1), second training data instance 302(2), and third training data instance 302(3) (collectively referred to herein as "training data instances 302"), shown in FIG. 3A, which are examples of training data instances 104 of FIG. 1. First training data instance 302(1) includes a first training input "User [15:00]-'Send $100 to X'" and a first training output "Agent [15:10]-'Done'." The agent may represent a customer agent (e.g., a human) conversing with the user that previously responded to the user's request. Second training data instance 302(2) includes a second training input "User [15:00]-'I need a copy of my paystub" and a second training output "Agent [15:01]-'Sure, I'm working on it . . . '." Third training data instance 302(3) includes a third training input "LLM [15:01]-'Sure, I'm working on it . . . " and a third training output of "Agent [15:10]-'Here you go'." Here, third training data instance 302(3) may be the continuation of the conversion after the conversation included in second training data instance 302(2).

Each of the first training data instance 302(1), the second training data instance 302(2), and the third training data instance 302(3) includes a first timestamp and a prompt or a response to a prompt (e.g., an intermediate response) in its respective training input, and a second timestamp and a response to the prompt or another response after the response to the prompt (e.g., a response after the intermediate response) in their its respective training output. For example, the first training input includes a first timestamp of "[15:00]" and a first prompt of "Send $100 to X." The first training output includes a second timestamp of "[15:05]" and a response to the prompt of "Done."

Time required calculation 304 may be performed for each of first training data instance 202(1), the second training data instance 202(2), and the third training data instance 202(3). Time required calculation 304 may include calculating an absolute time difference between the first timestamp and a second timestamp included in each training data instance 302. For example, an absolute time difference between the second timestamp [15:05] and the first timestamp [15:00] of first training data instance 302(1) is equal to five minutes. An absolute time difference between the second timestamp [15:01] and the first timestamp [15:00] of second training data instance 302(2) is equal to one minute. Additionally, an absolute time difference between the second timestamp

[15:11] and the first timestamp [15:01] of third training data instance 302(3) is equal to ten minutes.

After performing time required calculation 304, speaker and time tokens annotation 306 is performed. Speaker and time tokens annotation 306 includes annotating the training output of each respective training data instance to include (1) a speaker token identifying the LLM or a user (e.g. customer) communicating with the LLM and (2) a time token indicating the time difference calculated for the respective training data instance (e.g., during time required calculation 304).

For example, as shown in FIG. 3A, the first training output for first training data instance is annotated to include a speaker token of "LLM" and a time token of "[5]" indicating that the response "Done" may be generated by the LLM and takes five minutes to generate after receiving the prompt "Send $100 to X." The speaker token generated is "LLM" instead of "Agent," such that the LLM learns that the LLM (instead of a human agent) is expected to generate the response associated with the speaker token "LLM."

The first training input of first training data instance 302(1) is also annotated to be "User [NULL]." "NULL" is included for first training data instance 302(1) because first training data instance 302(1) is the initial prompt used to begin the conversation between the LLM and the user; thus, a time difference may not be calculated for this first training data instance 302(1) (e.g., no prior prompt and/or response's timestamp to use for calculating the time difference). Second training data instance 302(2) and third training data instance 302(3) are annotated similarly.

After speaker and time tokens annotation is performed for all training data instances 302, training 308 (e.g., an example of training 112 of FIG. 1) is performed to train the LLM to predict a speaker token and a time token when generating responses for subsequent prompts received by the LLM or generating responses after intermediate responses generated by the LLM.

Figure 3B:
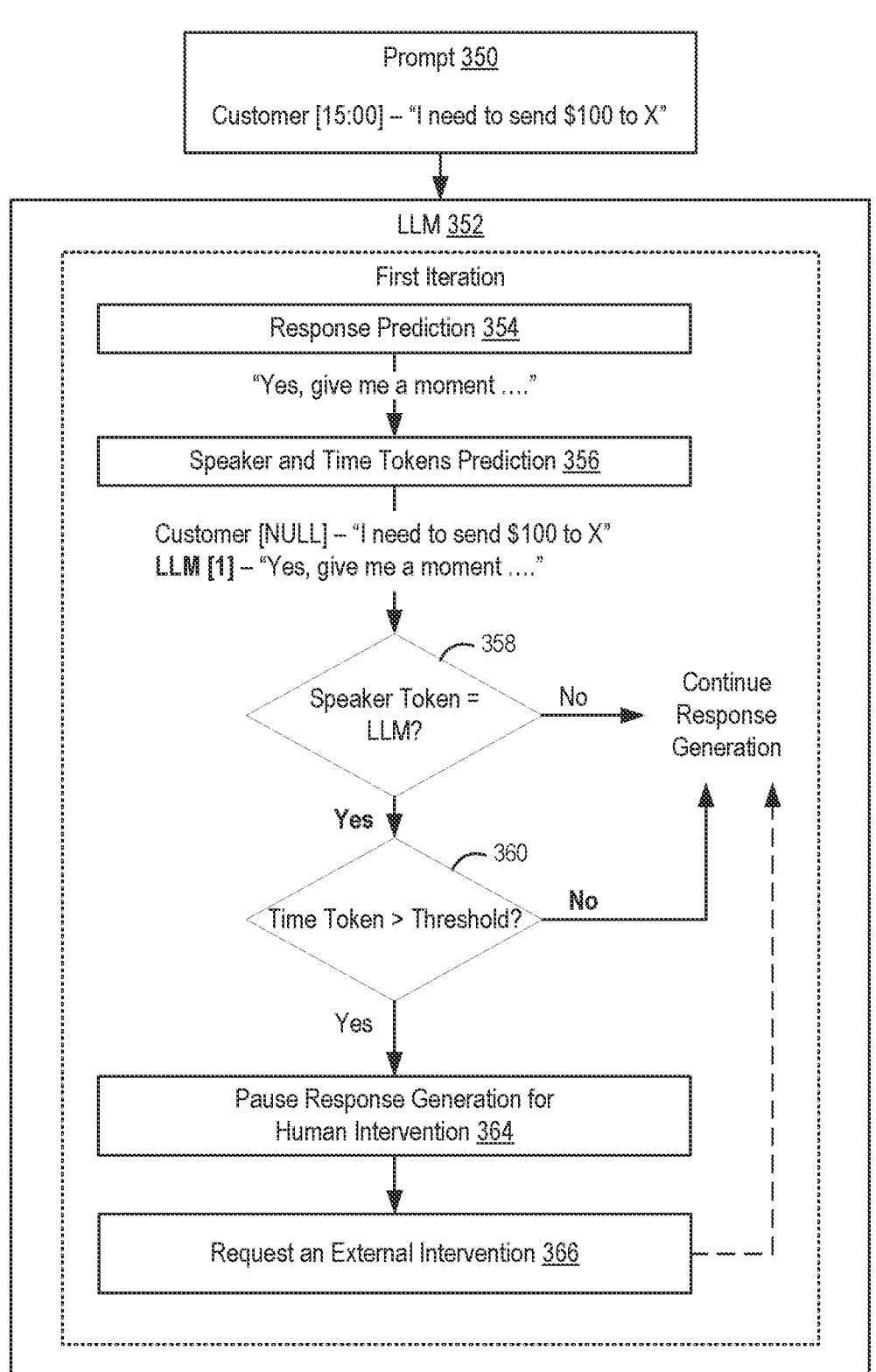
FIGS. 3B-3C depict example speaker and time tokens prediction for human intervention prompting.
Figure 3C:
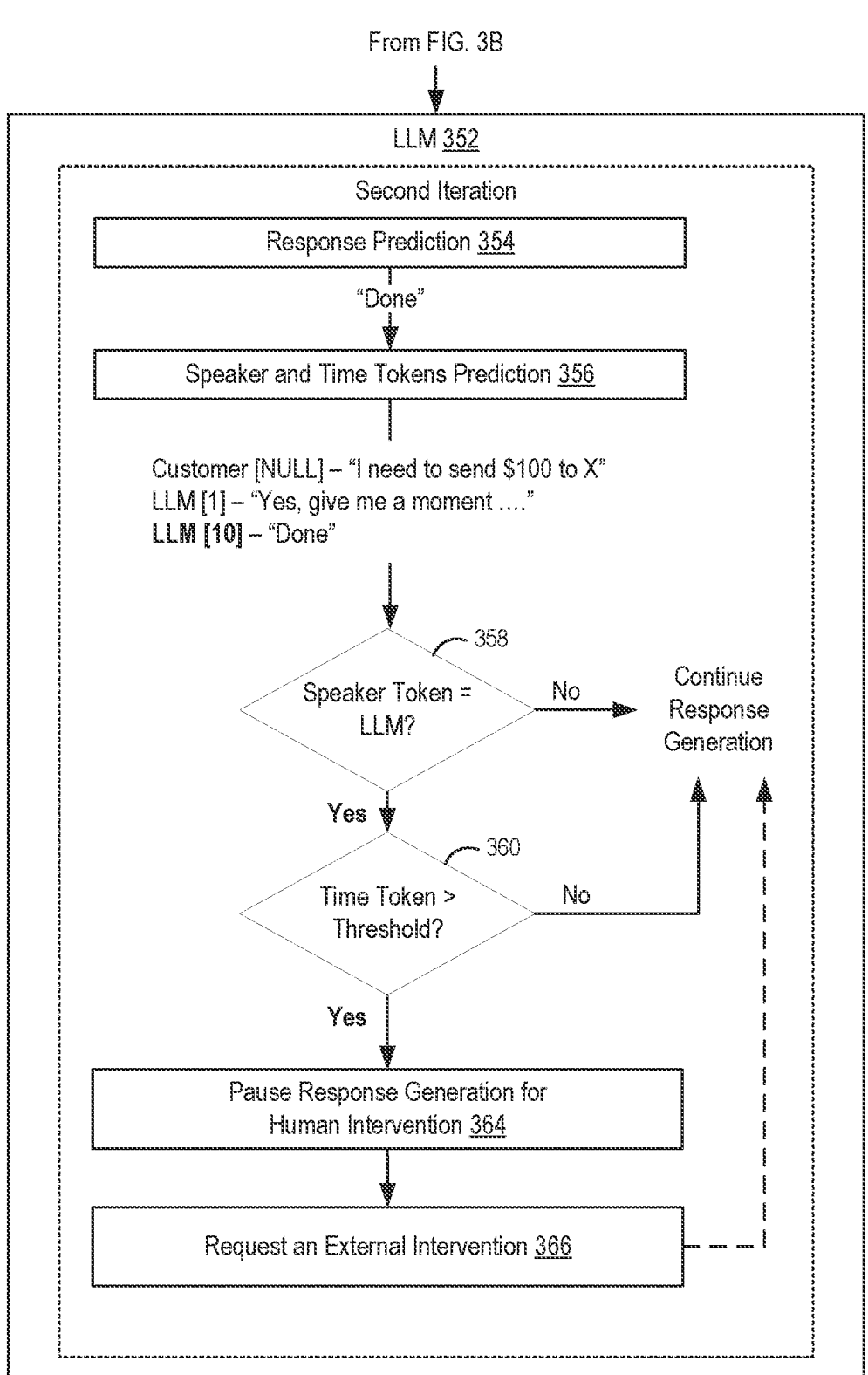

FIGS. 3B and 3C depict example speaker and time tokens prediction for human intervention prompting. A previously trained LLM (e.g., according to the steps described with respect to FIG. 3A) may be used for such speaker and time tokens prediction.

For example, as shown in FIG. 3B, an LLM 352 (e.g., trained to predict speaker and time tokens) receives a prompt 350. In this example, prompt 350 is a user request stating "I need to send $100 to X." Prompt 350 is a task oriented-prompt that $100 be successfully sent to X.

Based on receiving prompt 350, LLM 352 begins response prediction, as well as speaker and time tokens prediction. For example, in a first iteration shown in FIG. 3B, LLM 352 predicts a best response to prompt 350 (e.g., during response prediction 354). LLM 352 may determine that a best response to prompt 350 is "Yes, give me a moment." LLM 352 may make this determination without generating this response and without providing this response to the user (e.g., customer) that submitted prompt 350.

At speaker and time tokens prediction 356, LLM 352 then determines whether the predicted response "Yes, give me a moment . . . " is a response to prompt 350 that is expected to be generated by LLM 352 or received from the user. In this example, LLM 352 predicts that this response is expected to be generated by LLM 352; thus, a speaker token of "LLM" is generated. While LLM 352 may see the generated speaker token, the user may not.

Further, at speaker and time tokens prediction 356, LLM 352 predicts how long it is expected to take LLM 352, after receiving prompt 350, to generate the response "Yes, give me a moment . . . " (or in other cases, receive a response from the user if the speaker token is predicted to be "User"). In this example, LLM 352 predicts LLM 352 will take one minute to generate this response based on receiving prompt 350. As such, LLM 352 also generates a time token of "[1]" representing the predicted one minute time period. While LLM 352 may see the generated time token, the user may not.

Although response prediction 354 and speaker and time tokens prediction 356 are illustrated as separate steps in FIG. 3B, in certain embodiments, these steps are performed simultaneously such that LLM 352 predicts a speaker token, a time token, and a response at the same time. Further, although FIG. 3B illustrates LLM 352 predicting the next-in-time response (e.g., at response prediction 354) prior to generating a speaker token (e.g., at speaker and time tokens prediction 356), in some embodiments, LLM 352 first determines that the next-in-time speaker without predicting the next-in-time-response. For example, if LLM 352 determines that the predicted speaker is the customer, instead of the LLM, LLM 352 may generate the speaker token without predicting the next-in-time response.

To determine whether LLM 352 should pause response generation and initiate an external (e.g., human) intervention, LLM 352 first determines (e.g., at 358) whether the speaker identified by the generated speaker token comprises the LLM. If the speaker identified by the generated speaker token is not the LLM (e.g., instead the speaker token identifies the user as actor who will generate the predicted response), then LLM 352 determines no human intervention is required, and further that response generation by LLM 352 may continue. In this case, LLM 352 may wait to receive a response from the user.

On the other hand, if the speaker identified by the generated speaker token comprises the LLM 352, then LLM 352 determines (e.g., at 360) if the amount of time indicated in the generated time token is greater than a threshold (e.g., three minutes). If the amount of time indicated in the time token is not greater than the threshold (e.g., the amount of time indicated is less than the threshold), then LLM 352 determines that no human intervention is required, and further that response generation by LLM 352 may continue. In particular, a smaller amount of time may be indicate to LLM 352 that no task(s) are expected to be performed during this small amount of time.

On the other hand, if the amount of time indicated in the time token is greater than the threshold, then LLM 352 determines that human intervention is required, and further that response generation by LLM 352 needs to be paused. As such, the LLM 352 may pause response generation by LLM 352 for external intervention at 364 and further request an external intervention at 366.

In this example, LLM 352 determines, at 358, that the speaker identified by the speaker token is the LLM. Further, LLM 352 determines, at 360, that the amount of time indicated in the second time token is less than the threshold (e.g., 1 minute<3 minutes). As such, LLM 352 determines that external intervention is not needed prior to generating the predicted response of "Yes, give me a moment . . . " and proceeds with generating and providing this response to the user that submitted prompt 350.

LLM 352 may then continue response generation in FIG. 3C to predict a next response after "Yes, give me a moment . . . " In particular, as shown in FIG. 3C, for a second iteration, LLM 352 predicts a best response after intermediate response "Yes, give me a moment . . . " (e.g., during response prediction 354). LLM 352 may determine that a best response to the intermediate response is "Done." LLM 352 may make this determination without generating this response and without providing this response to the user (e.g., the customer that submitted prompt 350).

At speaker and time tokens prediction 356, LLM 352 then predicts that this predicted response "Done" is expected to be generated by LLM 352. Accordingly, a speaker token of "LLM" is predicted and generated. While LLM 352 may see the generated speaker token, the user may not.

Further, at speaker and time tokens prediction 356, LLM 352 predicts that LLM 352 will take ten minutes to predict this response after generating the intermediate response (e.g., "Yes, give me a moment . . . " As such, LLM 352 also generates a time token of "[10]" representing the predicted ten minute time period. While LLM 352 may see the generated time token, the user may not At 358, LLM 352 determines that the speaker identified by the speaker token is the LLM. Further, at 360, LLM 352 determines that the amount of time indicated in the second time token is greater than the threshold (e.g., 10 minutes>3 minutes). As such, LLM 352 determines that external intervention is needed prior to generating the predicted response of "Done" and proceeds with pausing response generation by LLM 352 and requesting an external intervention, at 364 and 366.

As described above, requesting external intervention may involve paging a human for assistance with the one or more tasks. Paging the human may trigger the human to perform the one or more tasks. In some cases, the human further generates the next-in-time response of "Done" and provides this to the user without the LLM 352's assistance, such as after completing the one or more tasks. However, in some other cases, after performing the one or more tasks, the human instructs the LLM 352 to continue response generation and proceed with generating the "Done" response.

In some cases, a speaker token and/or time token is generated with one or more errors. For example, a speaker token may be generated to indicate a speaker that is not the user and is not the LLM. In this case, the LLM 352 may detect the error, pause response generation, and generate an error such that corrective action can be taken (e.g., indicate to a human that an error has been detected such that corrective action can be taken). As another example, a time token may be generated as a non-integer value and/or a negative value. A non-integer value and/or a negative value may result in an error. In these cases, the LLM 352 may detect the error, pause response generation, and generate an error (e.g., to inform a human of the error).

Example Method for Training a LLM to Predict Action Tokens

FIG. 4 depicts an example method 400 for training a LLM to predict action tokens. Method 400 may be performed by one or more processor(s) of a computing device, such as processor(s) 702 of processing system 700 described below with respect FIG. 7.

Method 400 begins, at step 402, with obtaining a plurality of training data instances. Each of the plurality of training data instances may include a training input comprising a first timestamp and at least one of a prompt or an intermediate response to the prompt and a training output comprising a second timestamp and a response to the prompt or the intermediate response.

In some embodiments, the response to the prompt or the intermediate response included in the training output of each of the plurality of training data instances is a next-in-time response to the prompt or the intermediate response.

Method 400 proceeds, at step 404, with annotating the training output of one or more training data instances to include an action token indicating that external intervention is required between the first timestamp and the second timestamp of the respective training data instance. The annotation may be based on a time difference between the second timestamp and the first timestamp of each respective training data instance, a number of words included in the response associated with the training output of the respective training data instance, and/or at least one trigger word included in the response associated with the training output of the respective training data instance.

In some embodiments, annotating the training output of the respective training data instance to include the action token based on the time difference between the second timestamp and the first timestamp and the number of words included in the response associated with the training output of the respective training data instance includes calculating the time difference between the second timestamp and the first timestamp, determining the number of the words included in the response associated with the training output, calculating a speed metric as a ratio of the number of the words to the time difference, determining the speed metric is greater than a threshold, and annotating the training output of the respective training data instance to include the action token based on the speed metric being greater than the threshold.

In some embodiments, annotating the training output of the respective training data instance to include the action token based on the at least one trigger word included in the response associated with the training output of the respective training data instance includes determining at least one word included in the response is included in a list of known trigger words; and annotating the training output of the respective training data instance to include the action token based on the determination.

Method 400 proceeds, at step 406, with training the LLM on the plurality of training data instances to predict when external intervention is required and accordingly generate the action token to request the external intervention.

In some embodiments, method 400 further includes training the LLM to pause response generation after generating the action token.

Training the LLM to predict when external intervention is required and accordingly request external intervention and pause response generation improves functionality of the LLM. In particular, based on such training, an LLM may be internally capable of (1) realizing that external interaction is needed to properly respond to one or more prompts, and further (2) realizing that to have a natural language flow, the LLM may need to not only prompt for that external interaction, but also wait for that intervention to take place before again re-starting response generation (e.g., and in some cases, generating a response to the received prompt to provide a meaningful response).

Note that FIG. 4 is just one example of a method, and other methods including fewer, additional, or alternative steps are possible consistent with this disclosure.

Example Method for Training a LLM to Predict Speaker and Time Tokens

Figure 5:
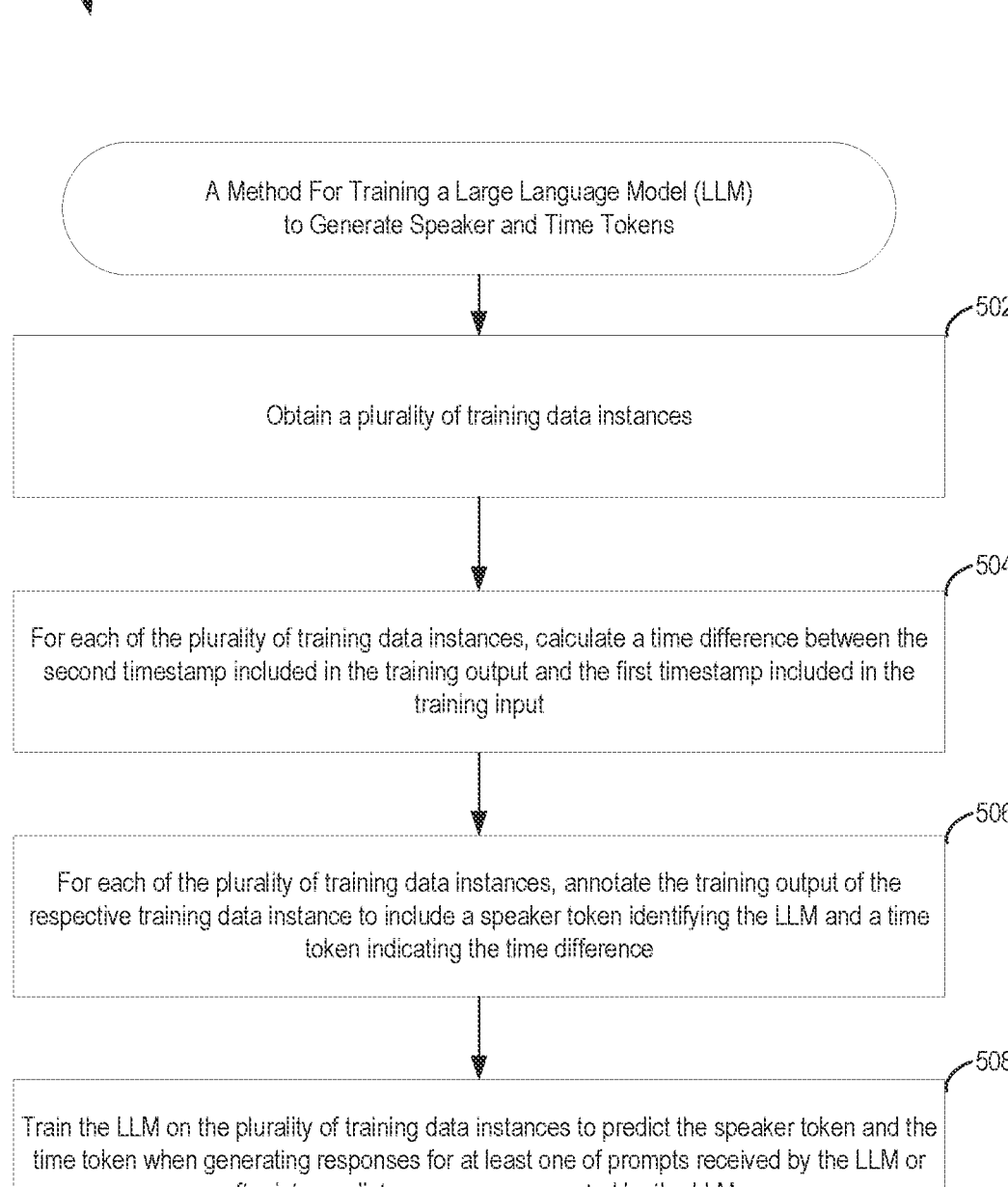
FIG. 5 depicts an example method for training an LLM to predict specialized tokens, such as speaker and time tokens.

FIG. 5 depicts an example method 500 for training a LLM to predict speaker and time tokens. Method 500 may be performed by one or more processor(s) of a computing device, such as processor(s) 702 of processing system 700 described below with respect FIG. 7.

Method 500 begins, at step 502, with obtaining a plurality of training data instances. Each of the plurality of training data instances may include a training input comprising a first timestamp and a prompt or an intermediate response to the prompt and a training output comprising a second timestamp and a response to the prompt or a response after the intermediate response.

Method 500 proceeds, at step 504, with, for each of the plurality of training data instances, calculating a time difference between the second timestamp included in the training output and the first timestamp included in the training input.

Method 500 proceeds, at step 506, with, for each of the plurality of training data instances, annotating the training output of the respective training data instance to include a speaker token identifying the LLM and a time token indicating the time difference.

Method 500 proceeds, at step 508, with training the LLM on the plurality of training data instances to predict the speaker token and the time token when generating responses for at least one of prompts received by the LLM or after intermediate responses generated by the LLM.

As described above, training LLMs to predict when external intervention is required and accordingly request external intervention and pause response generation enhances the capability of existing LLMs to request external intervention and provide more accurate, reliable, and meaningful responses.

Note that FIG. 5 is just one example of a method, and other methods including fewer, additional, or alternative steps are possible consistent with this disclosure.

Figure 6:
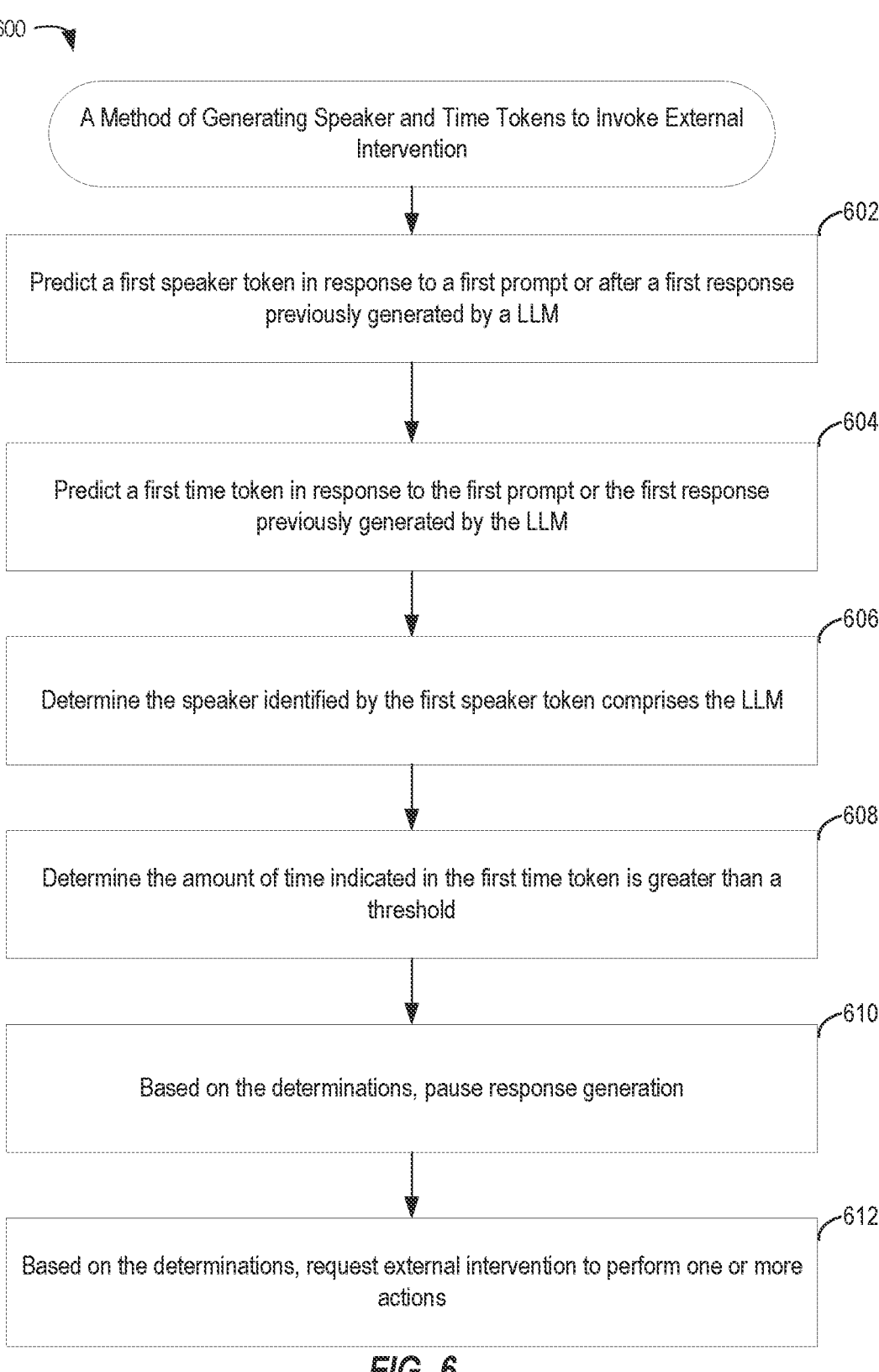
FIG. 6 depicts an example method for predicting specialized tokens.

Example Method of Predicting Speaker and Time Tokens to Prompt External Intervention FIG. 6 depicts an example method 600 of predicting speaker and time tokens to prompt external intervention. Method 600 may be performed by one or more processor(s) of a computing device, such as processor(s) 702 of processing system 700 described below with respect FIG. 7.

Method 600 begins, at step 602, with predicting a first speaker token in response to a first prompt or a first response previously generated by a LLM. The first speaker token may identify a speaker predicted to respond to the first prompt or after the first response previously generated by the LLM.

Method 600 proceeds, at step 604, with predicting a first time token in response to the first prompt or the first response previously generated by the LLM. The first time token may indicate an amount of time predicted for generating a first natural language response or receiving a first user-submitted response to the first prompt or after the first response previously generated by the LLM.

Method 600 proceeds, at step 606, with determining the speaker identified by the first speaker token comprises the LLM.

Method 600 proceeds, at step 608, with determining the amount of time indicated in the first time token is greater than a threshold.

Method 600 proceeds, at step 610, with, based on the determinations, pausing response generation.

Method 600 proceeds, at step 612, with, based on the determinations, requesting external intervention to perform one or more actions.

In some embodiments, method 600 further includes predicting a second speaker token in response to a second prompt or a second response previously generated by the LLM, the second speaker token identifying a speaker predicted to respond to the second prompt or after the second response previously generated by the LLM; predicting a second time token in response to the second prompt or after the second response previously generated by the LLM, the second time token indicating an amount of time predicted for generating a second natural language response or receiving a second user-submitted response to the second prompt or the second response previously generated by the LLM; determining the speaker identified by the second speaker token comprises the LLM; determining the amount of time indicated in the second time token is less than the threshold; and generating the second natural language response.

In some embodiments, method 600 further includes predicting a second speaker token in response to a second prompt or a second response previously generated by the LLM, the second speaker token identifying a speaker predicted to respond to the second prompt or after the second response previously generated by the LLM; predicting a second time token in response to the second prompt or the second response previously generated by the LLM, the second time token indicating an amount of time predicted for generating a second natural language response or receiving a second user-submitted response to the second prompt or after the second response previously generated by the LLM; determining the speaker identified by the second speaker token comprises a user; and waiting to receive the second user-submitted response.

In some embodiments, method 600 further includes predicting a second speaker token in response to a second response previously generated by the LLM for a second prompt, the second speaker token identifying a speaker predicted to respond after the second response previously generated by the LLM; predicting a second time token in response to the second response previously generated by the LLM, the second time token indicating an amount of time predicted for generating a second natural language response after the second response previously generated by the LLM; determining the speaker identified by the second speaker token comprises the LLM; determining the amount of time indicated in the second time token is greater than the threshold; predicting the second natural language response after the second response previously generated by the LLM comprises at least one trigger word; and waiting the predicted amount of time before generating the second natural language response.

In some embodiments, the amount of time included in the first time token comprises an integer. In some embodiments, method 600 further includes predicting a second speaker token in response to a second prompt or after a second response previously generated by the LLM, the second speaker token identifying a speaker predicted to respond to the second prompt or after the second response previously generated by the LLM; predicting a second time token in response to the second prompt or the second response previously generated by the LLM, the second time token indicating an amount of time predicted for generating a second natural language response or receiving a second user-submitted response to the second prompt or the second response previously generated by the LLM; detecting an error associated with the second time token based on the second time token lacking an integer; and based on detecting the error: pausing the response generation; and requesting the external intervention.

In some embodiments, method 600 further includes, after pausing the response generation and requesting the external intervention to perform the one or more actions, receiving an instruction to continue the response generation and generate the first natural language response.

Note that FIG. 6 is just one example of a method, and other methods including fewer, additional, or alternative steps are possible consistent with this disclosure.

Example Processing System for Special Token Generation

Figure 7:
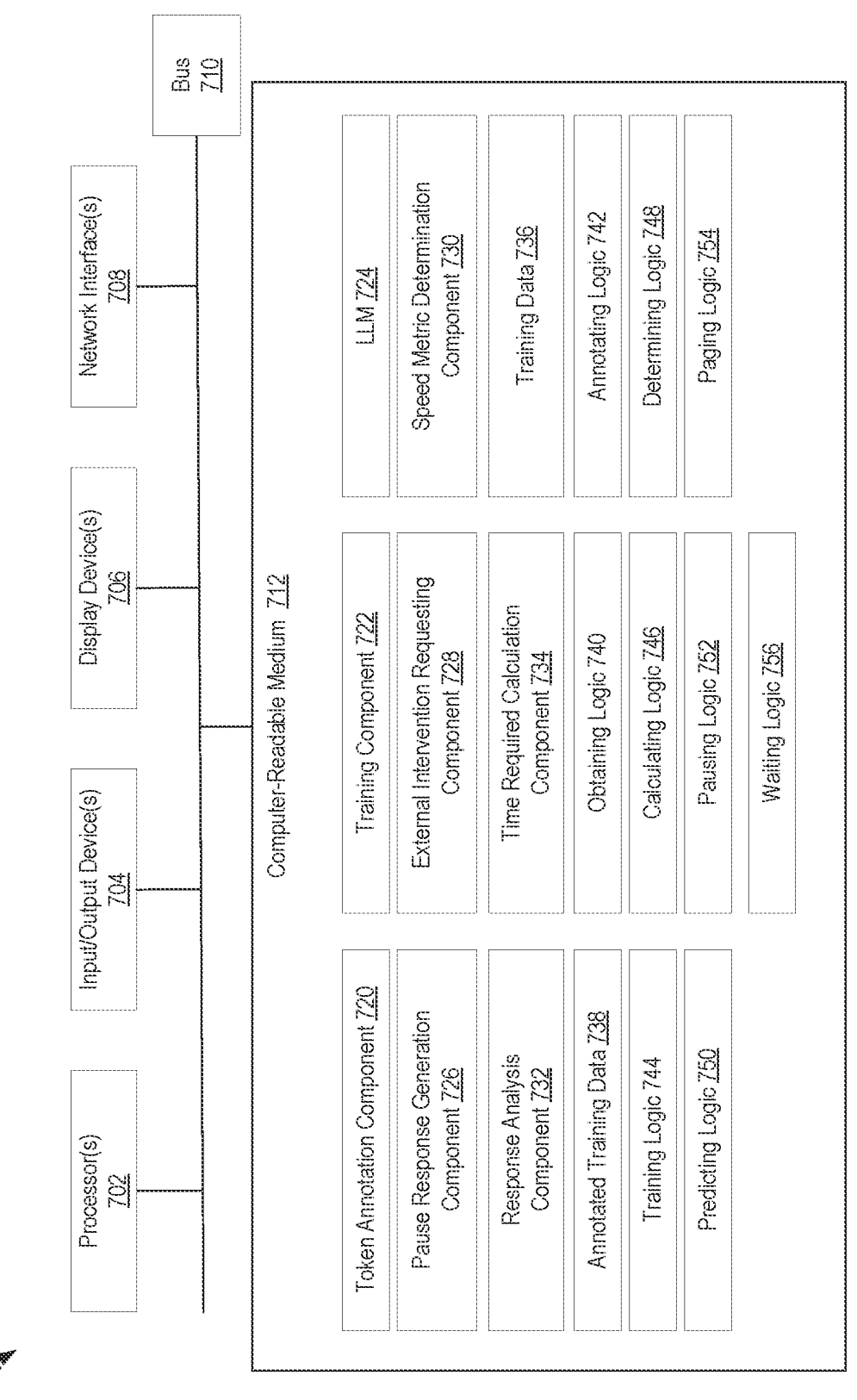
FIG. 7 depicts an example processing system with which aspects of the present disclosure can be performed.

FIG. 7 depicts an example processing system 700 configured to perform various aspects described herein, including, for example, method 400 as described above with respect to FIG. 4, method 500 as described above with respect to FIG. 5, and/or method 600 as described above with respect to FIG. 6.

Processing system 700 may generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of a one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes token annotation component 720, training component 722, LLM 724, pause response generation component 726, external intervention requesting component 728, speed metric determination component 730, response analysis component 732, time required calculation component 734, training data 736, annotated training data 738, obtaining logic 740, annotating logic 742, training logic 744, calculating logic 746, determining logic 748, predicting logic 750, pausing logic 752, paging logic 754, and waiting logic 756.

In some embodiments, obtaining logic 740 includes logic for obtaining a plurality of training data instances.

In some embodiments, annotating logic 742 includes logic for annotating the training output of one or more training data instances to include an action token indicating that external intervention is required between the first timestamp and the second timestamp of the respective training data instance. In some embodiments, annotating logic 742 includes logic for annotating the training output of the respective training data instance to include the action token based on the speed metric being greater than the threshold. In some embodiments, annotating logic 742 includes logic for annotating the training output of the respective training data instance to include the action token based on the determination. In some embodiments, annotating logic 742 includes logic for annotating the training output of the respective training data instance to include a speaker token identifying the LLM and a time token indicating the time difference.

In some embodiments, training logic 744 includes logic for training the LLM on the plurality of training data instances to predict when external intervention is required and accordingly generate the action token to invoke the external intervention. In some embodiments, training logic 744 includes logic for training the LLM to pause response generation after generating the action token. In some embodiments, training logic 744 includes logic for training the LLM on the plurality of training data instances to predict the speaker token and the time token when generating responses for at least one of prompts received by the LLM or intermediate responses generated by the LLM.

In some embodiments, calculating logic 746 includes logic for calculating the time difference between the second timestamp and the first timestamp. In some embodiments, calculating logic 746 includes logic for calculating a speed metric as a ratio of the number of the words to the time difference. In some embodiments, calculating logic 746 includes logic for calculating a time difference between the second timestamp included in the training output and the first timestamp included in the training input.

In some embodiments, determining logic 748 includes logic for determining the number of the words included in the response associated with the training output. In some embodiments, determining logic 748 includes logic for determining the speed metric is greater than a threshold. In some embodiments, determining logic 748 includes logic for determining at least one word included in the response is included in a list of known trigger words.

In some embodiments, determining logic 748 includes logic for determining a speaker identified by a speaker token comprises the LLM or a user in conversation with the LLM. In some embodiments, determining logic 748 includes logic for determining an amount of time indicated in a time token is greater than a threshold, less than the threshold, or comprises an error.

In some embodiments, predicting logic 750 includes logic for predicting a speaker token in response to a prompt or a response previously generated by a LLM. In some embodiments, predicting logic 750 includes logic for predicting a time token in response to a prompt or a response previously generated by a LLM.

In some embodiments, pausing logic 752 includes logic for pausing response generation by the LLM.

In some embodiments, paging logic 754 includes logic for paging a human to perform one or more actions (e.g., an example of requesting external intervention).

Note that FIG. 7 is just one example of a processing system consistent with aspects described herein, and other processing systems having additional, alternative, or fewer components are possible consistent with this disclosure.

Example Clauses

Implementation examples are described in the following numbered clauses:

Clause 1: A method for training a large language model (LLM) to predict action tokens, comprising: obtaining a plurality of training data instances, wherein each of the plurality of training data instances comprises: a training input comprising a first timestamp and at least one of a prompt or an intermediate response to the prompt; and a training output comprising a second timestamp and a response to the prompt or the intermediate response; annotating the training output of one or more training data instances to include an action token indicating that external intervention is required between the first timestamp and the second timestamp of the respective training data instance, wherein the annotation is based on at least one of: a time difference between the second timestamp and the first timestamp of each respective training data instance; a number of words included in the response associated with the training output of the respective training data instance; or at least one trigger word included in the response associated with the training output of the respective training data instance; and training the LLM on the plurality of training data instances to predict when external intervention is required and accordingly generate the action token to invoke the external intervention.

Clause 2: The method of Clause 1, wherein annotating the training output of the respective training data instance to include the action token based on the time difference between the second timestamp and the first timestamp and the number of words included in the response associated with the training output of the respective training data instance comprises: calculating the time difference between the second timestamp and the first timestamp; determining the number of the words included in the response associated with the training output; calculating a speed metric as a ratio of the number of the words to the time difference; determining the speed metric is greater than a threshold; and annotating the training output of the respective training data instance to include the action token based on the speed metric being greater than the threshold.

Clause 3: The method of any one of Clauses 1-2, wherein annotating the training output of the respective training data instance to include the action token based on the at least one trigger word included in the response associated with the training output of the respective training data instance comprises: determining at least one word included in the response is included in a list of known trigger words; and annotating the training output of the respective training data instance to include the action token based on the determination.

Clause 4: The method of any one of Clauses 1-3, further comprising training the LLM to pause response generation after generating the action token.

Clause 5: The method of any one of Clauses 1-4, wherein the response to the prompt or the intermediate response included in the training output of each of the plurality of training data instances comprises a next-in-time response to the prompt or the intermediate response.

Clause 6: A method for training a large language model (LLM) to predict speaker and time tokens, comprising: obtaining a plurality of training data instances, wherein each of the plurality of training data instances comprises: a training input comprising a first timestamp and a prompt or an intermediate response to the prompt; and a training output comprising a second timestamp and a response to the prompt or after the intermediate response; for each of the plurality of training data instances: calculating a time difference between the second timestamp included in the training output and the first timestamp included in the training input; and annotating the training output of the respective training data instance to include a speaker token identifying the LLM and a time token indicating the time difference; and training the LLM on the plurality of training data instances to predict the speaker token and the time token when generating responses for at least one of prompts received by the LLM or after intermediate responses generated by the LLM.

Clause 7: A method of predicting specialized tokens to prompt external intervention, comprising: predicting a first speaker token in response to a first prompt or a first response previously generated by a large language model (LLM), the first speaker token identifying a speaker predicted to respond to the first prompt or respond after the first response previously generated by the LLM; predicting a first time token in response to the first prompt or the first response previously generated by the LLM, the first time token indicating an amount of time predicted for generating a first natural language response or receiving a first user-submitted response to the first prompt or after the first response previously generated by the LLM; determining the speaker identified by the first speaker token comprises the LLM; determining the amount of time indicated in the first time token is greater than a threshold; and based on the determinations: pausing response generation by the LLM; and requesting external intervention to perform one or more actions.

Clause 8: The method of Clause 7, further comprising: predicting a second speaker token in response to a second prompt or a second response previously generated by the LLM, the second speaker token identifying a speaker predicted to respond to the second prompt or after the second response previously generated by the LLM; predicting a second time token in response to the second prompt or the second response previously generated by the LLM, the second time token indicating an amount of time predicted for generating a second natural language response or receiving a second user-submitted response to the second prompt or after the second response previously generated by the LLM; determining the speaker identified by the second speaker token comprises the LLM; determining the amount of time indicated in the second time token is less than the threshold; and generating the second natural language response.

Clause 9: The method of Clause 7, further comprising: predicting a second speaker token in response to a second prompt or a second response previously generated by the LLM, the second speaker token identifying a speaker predicted to respond to the second prompt or after the second response previously generated by the LLM; predicting a second time token in response to the second prompt or the second response previously generated by the LLM, the second time token indicating an amount of time predicted for generating a second natural language response or receiving a second user-submitted response to the second prompt or after the second response previously generated by the LLM; determining the speaker identified by the second speaker token comprises a user; and waiting to receive the second user-submitted response.

Clause 10: The method of Clause 7, further comprising: predicting a second speaker token in response to a second response previously generated by the LLM for a second prompt, the second speaker token identifying a speaker predicted to respond after the second response previously generated by the LLM; predicting a second time token in response to the second response previously generated by the LLM, the second time token indicating an amount of time predicted for generating a second natural language response after the second response previously generated by the LLM; determining the speaker identified by the second speaker token comprises the LLM; determining the amount of time indicated in the second time token is greater than the threshold; predicting the second natural language response after the second response previously generated by the LLM comprises at least one trigger word; and waiting the predicted amount of time before generating the second natural language response.

Clause 11: The method of any one of Clauses 7-10, wherein the amount of time included in the first time token comprises an integer.

Clause 12: The method of Clause 7, further comprising: predicting a second speaker token in response to a second prompt or a second response previously generated by the LLM, the second speaker token identifying a speaker predicted to respond to the second prompt or after the second response previously generated by the LLM; predicting a second time token in response to the second prompt or the second response previously generated by the LLM, the second time token indicating an amount of time predicted for generating a second natural language response or receiving a second user-submitted response to the second prompt or after the second response previously generated by the LLM; detecting an error associated with the second time token based on the second time token lacking an integer; and based on detecting the error: pausing the response generation; and requesting external intervention.

Clause 13: The method of any one of Clauses 7-12, further comprising, after pausing the response generation and requesting external intervention, receiving an instruction to continue the response generation and generate the first natural language response.

Clause 14: A processing system, comprising: one or more memories comprising computer-executable instructions; and one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a large language model (LLM) to predict action tokens, comprising:
    obtaining a plurality of training data instances, wherein each of the plurality of training data instances comprises:
        a training input comprising a first timestamp and at least one of a prompt or an intermediate response to the prompt; and
        a training output comprising a second timestamp and a response to the prompt or the intermediate response;
    annotating the training output of a respective training data instance of the plurality of training data instances to include an action token indicating that external intervention is required between the first timestamp and the second timestamp of the respective training data instance, wherein the annotating is based on at least one of:
        a time difference between the second timestamp and the first timestamp of the respective training data instance;
        a number of words included in the response associated with the training output of the respective training data instance; or
        at least one trigger word included in the response associated with the training output of the respective training data instance; and
    training the LLM on the plurality of training data instances to predict when external intervention is required and accordingly generate the action token to invoke the external intervention.

2. The method of claim 1, wherein annotating the training output of the respective training data instance to include the action token based on the time difference between the second timestamp and the first timestamp and the number of words included in the response associated with the training output of the respective training data instance comprises:
    calculating the time difference between the second timestamp and the first timestamp;

determining the number of words included in the response associated with the training output;
    calculating a speed metric as a ratio of the number of words included in the response associated with the training output to the time difference;
    determining the speed metric is greater than a threshold; and
    annotating the training output of the respective training data instance to include the action token based on the speed metric being greater than the threshold.

3. The method of claim 1, wherein annotating the training output of the respective training data instance to include the action token based on the at least one trigger word included in the response associated with the training output of the respective training data instance comprises:
    determining at least one word included in the response is included in a list of known trigger words; and
    annotating the training output of the respective training data instance to include the action token based on the determination.

4. The method of claim 1, further comprising training the LLM to pause response generation after generating the action token.

5. The method of claim 1, wherein the response to the prompt or the intermediate response included in the training output of each of the plurality of training data instances comprises a next-in-time response to the prompt or the intermediate response.

6. An apparatus, comprising:
    one or more memories comprising processor-executable instructions;
    and one or more processors configured to execute the processor-executable instructions and cause the apparatus to:
        obtain a plurality of training data instances, wherein each of the plurality of training data instances comprises:
            a training input comprising a first timestamp and at least one of a prompt or an intermediate response to the prompt; and
            a training output comprising a second timestamp and a response to the prompt or the intermediate response;
        annotate the training output of a respective training data instance of the plurality of training data instances to include an action token indicating that external intervention is required between the first timestamp and the second timestamp of the respective training data instance, wherein the annotation is based on at least one of:
            a time difference between the second timestamp and the first timestamp of the respective training data instance;
            a number of words included in the response associated with the training output of the respective training data instance; or
            at least one trigger word included in the response associated with the training output of the respective training data instance; and
        train a large language model (LLM) on the plurality of training data instances to predict when external intervention is required and accordingly generate the action token to invoke the external intervention.

7. The apparatus of claim 6, wherein to annotate the training output of the respective training data instance to include the action token based on the time difference between the second timestamp and the first timestamp and the number of words included in the response associated with the training output of the respective training data instance, the one or more processors are configured to execute the processor-executable instructions and cause the apparatus to:

calculate the time difference between the second timestamp and the first timestamp;

determine the number of words included in the response associated with the training output;

calculate a speed metric as a ratio of the number of words included in the response associated with the training output to the time difference;

determine the speed metric is greater than a threshold; and annotate the training output of the respective training data instance to include the action token based on the speed metric being greater than the threshold.

8. The apparatus of claim 6, wherein to annotate the training output of the respective training data instance to include the action token based on the at least one trigger word included in the response associated with the training output of the respective training data instance, the one or more processors are configured to execute the processor-executable instructions and cause the apparatus to:

determine at least one word included in the response is included in a list of known trigger words; and annotate the training output of the respective training data instance to include the action token based on the determination.

9. The apparatus of claim 6, wherein the one or more processors are configured to execute the processor-executable instructions and further cause the apparatus to train the LLM to pause response generation after generating the action token.

10. The apparatus of claim 6, wherein the response to the prompt or the intermediate response included in the training output of each of the plurality of training data instances comprises a next-in-time response to the prompt or the intermediate response.

* * * * *